Patented Nov. 1, 1938

2,135,151

UNITED STATES PATENT OFFICE 2,135,151

METHOD OF MULTIPLE-COATING OR FINISHING

Milton O. Schur, Berlin, N. H., assignor to Brown Company, Berlin, N. H., a corporation of Maine No Drawing. Application May 23, 1936, Serial No. 81,486

9 Claims. (Cl. 91—68)

This invention relates to a method of coating or finishing involving more particularly the use of a rubber latex coating composition of the sort that is to be applied to sheet material or the like a number of times and that is designed to dry smoothly and with proper amalgamation or merger of the separately applied thicknesses. While not limited thereto, the method of the present invention may be applied advantageously in finishing the surface of artificial leather base or sheet material of the kind comprising a fibrous base, for instance, a felted fibrous base, itself impregnated with rubber latex or similar rubber or rubber-like composition and dried. Indeed, the method hereof has been found to be of great utility in finishing artificial leathers intended for such exacting service as shoe-upper stock and comprising a rubber-impregnated web of felted fibers fabricated from refined wood pulps on machinery of the papermaking type under conditions leading to a web of good uniformity of texture and evenness of surface.

I have found that an aqueous coating composition comprising water-dispersed rubber, such as rubber latex solids, and preferably also water-soluble glue or other water-soluble, film-forming or hardening material, has many advantageous qualities for the coating or finishing of various bases and more especially an artificial leather base comprising a rubber-impregnated fibrous sheet. Indeed, such a composition lends to an artificial leather a surface reminiscent in many respects of the skin or enamel side of natural leather, particularly when it contains glue and its glue content undergoes an after-tanning treatment with formaldehyde or other insolubilizing agent that develops maximum wet scuff-resistance therein and when it contains glycerine as a flexibilizing agent that imparts a mellow or pliant feel thereto as well as increases its flex endurance and prevents migration thereinto of such glycerine as may have been introduced along with latex solids into the body of the artificial leather in the manner and for the purpose disclosed in my application Serial No. 575,164, filed November 14, 1931. I have further found that for the multiple-coating method hereof it is most desirable to emulsify into the aqueous coating composition in a substantially non-separating state sufficient water-immiscible but volatile rubber solvent to swell the dispersed rubber particles appreciably but short of inducing their coagulation. Through such use of a rubber solvent in the composition, it is possible to gain such important benefits as perfect amalgamation or welding of successive coats even though each coat is substantially completely dried before the next one is applied so as to avoid otherwise existing "running" tendencies in the composition and attendant streakiness or blotchiness of surface. Evidently the rubber solvent not only softens and swells the dispersed rubber particles of the composition so as to transform them to a stickier or tackier state, but softens an already deposited dried layer of composition so as to result in an autogenous weld between layers, each layer being in effect an increment that contributes to the masking of surface blemishes on the base being coated and to the building up of an adequately thick wear-resistant structure whose integrality is perhaps best shown by the fact that under scuff or abrasion tests there is no observable tendency for peeling or separation between layers such as would detract from the serviceability of a coated artificial leather for such uses, e. g. shoe upper stock, as require high wet and dry scuff resistance.

I shall now describe typical coating compositions answering the purposes of my invention and how they were prepared. It might be remarked that the compositions about to be described were prepared with a view toward being used in coating artificial leather of the general character disclosed in my already-mentioned patent application Serial No. 575,164. According to that application, artificial leather is made by impregnating a fibrous base with glycerinated latex and then drying the impregnated base. That application dwells in particular upon the use of a soft, highly absorbent base such as is fabricated on machinery of the papermaking type from fiber furnishes containing largely refined but substantially unhydrated cellulose pulp, e. g. wood pulp of an alpha cellulose content of at least about 93%. It further stresses the value of the glycerine in developing the desired pliancy or mellowness in the artificial leather without detracting from its toughness and other leather-like qualities. When the coating compositions of the present invention are applied to such artificial leather, it is desirable to introduce glycerine thereinto for the reasons already indicated. Here is the formula of a typical coating composition in terms of its non-aqueous ingredients other than the rubber-swelling agent:

| | Percent by weight |
|---|---|
| Rubber latex solids | 72 |
| Glue | 16 |
| Glycerine | 10 |
| Remainder black dye, anti-oxidant and a wetting-out agent. | |

The composition contains additionally 75% by weight of toluol, based on all of its non-aqueous ingredients exclusive of the toluol. The total water content of the finished composition may be adjusted so that it contains about 15% by weight of all non-aqueous ingredients exclusive of the toluol. In addition to the advantages already mentioned, it has been found that the composition deposits smoothly on the artificial leather base, probably because the toluol tends to dissolve such greasy or other surface-resistant impurities as would otherwise cause localized shedding and thinning out of the aqueous composition. The toluol also has a preservative effect on the composition, permitting the composition to be kept longer without putrefaction than is otherwise the case.

In preparing the foregoing composition, it is preferable first to deammoniate the usual ammonia-preserved rubber latex of commerce used as a principal raw material. Otherwise the addition of rubber solvent to the rubber latex may cause undue thickening and subsequent coagulation to take place. Deammoniation of the latex may be effected by aerating it until substantially all of its ammonia content has been expelled. Substantially complete deammoniation of the latex may also be had with little danger of local coagulation by the addition thereto of such mild coagulation acids as citric, oleic, lactic, oxalic, etc. However, deammoniation of the latex by aeration is preferable in that such practice avoids an infusion into the latex of bodies that may be undesirable therein even in such small amount as attends substantial neutralization of the ammonia content of ordinary ammonia-preserved latex of commerce. The glycerine, dye, and anti-oxidant may be mixed directly into the latex. To this latex mixture is then added an aqueous solution of the glue containing stably emulsified therein the toluol, a suitable wetting-out agent, such as "Nekal BX", a sodium salt of a naphthalene sulphonic acid with side chains, preferably being present in slight amount to enhance the stability of the emulsion. The desired emulsion of toluol in the aqueous glue solution may readily be prepared by dissolving the glue and wetting-out agent in water, raising it to a temperature of, say, about 100° F., and gradually adding the toluol to the solution with stirring. The emulsion is gradually added with gentle stirring to the latex mixture. The viscosity of the final mixture slowly rises during the first hour or two as the rubber particles therein absorb and are swollen by the toluol and then remains substantially constant.

Another typical coating composition useful in the method hereof has substantially the following formula in terms of its non-aqueous ingredients other than the rubber-swelling agent:

|  | Per cent by weight |
|---|---|
| Rubber latex solids | 66.2 |
| Glue | 14.5 |
| Glycerine | 9.2 |
| Pigment | 9.27 |
| Wetting-out agent | 0.5 |
| Anti-oxidant | 0.33 |

This composition also contains additionally 75% by weight of toluol, based on all of its non-aqueous ingredients exclusive of the toluol; and the concentration of all the non-aqueous ingredients other than the toluol in the finished composition is 15% by weight of the finished composition. The composition may be prepared advantageously in the same way as the first-named composition.

The formulae of the foregoing compositions are subject to considerable variation. Thus, the volatile rubber solvent employed may be xylol, gasoline, benzol, or their equivalents. However, toluol has worked out well in routine production because it is not too volatile at room temperature while possessing sufficient volatility to be volatilized with sufficient rapidity in a current of warm air. In this connection, it might be noted that when artificial leather is repeatedly coated with the composition of the present invention, it is repeatedly run through a closed chamber in which currents of warm air are brought to play on each coating to dry it quickly so that a succeeding coating may be applied thereover. Toluol not only gives satisfactory results in the foregoing coating practice, but is reasonably cheap, not too hazardous from either a fire or health standpoint, and lends itself to easy emulsification as hereinbefore described. It is possible to reduce or increase the amount of toluol in the compositions hereinbefore described but without any particular benefit. In any event, sufficient rubber solvent is used to swell the dispersed rubber particles appreciably but far short of inducing their coagulation. While the ratio between the rubber latex solids and water-soluble glue in the composition is also subject to considerable variation, a composition intended for coating artificial leather preferably contains distinctly less glue than rubber latex solids and, correspondingly, contains much less glycerine than rubber solvent.

Despite the fact that the coating compositions used in the method hereof contain the very ingredients, namely, rubber and rubber solvent that go to make the viscous and extremely sticky mixtures or so-called rubber cements of the prior art, they are very fluent and in no way resemble in outward appearance such rubber cements. It might be observed that although the glue ingredient is primarily valued because of the qualities that it imparts to the dried coatings yielded by the coating composition of the present invention, yet it serves additionally as a remarkably efficient emulsifying agent for the rubber solvent so that there is no tendency whatever for the rubber solvent to separate out from the compositions. In using the term "glue" herein and in the appended claims, it should be understood that I mean to include albuminous substances, such as blood albumen, constituting equivalents of glue.

I have hereinbefore indicated that the glue content of the coating composition is preferably insolubilized or tanned in order to acquire maximum wet scuff-resistance. To this end, after the successive coats of composition have been dried or set on the artificial leather base, the coated base may be exposed to formaldehyde fumes or vapors at elevated temperature, under which conditions the glue content of the successive coats is tanned or insolubilized.

If desired, such film-forming substances as viscose, waterglass, water-soluble starches, etc., which are compatible with rubber latex, may be used in lieu of, or together with, the water-insoluble glue so as to develop the desired hardness and smoothness in the layer or coating deposited from the compositions employed in the method hereof. So, too, the method hereof might be employed with the coating compositions hereof containing, in lieu of glycerine, such equivalents of glycerine as ethylene glycol and other homologues, glucose, etc., which function to plasticize the protein and resin content of the rubber latex and/or to soften the fiber of the base to which such compositions are applied and more especially a rubber-impregnated, fibrous base itself containing glycerine or other fiber-softening agents that impart thereto a mellow or pliant feel and increased flex endurance, as hereinbefore described.

So far as concerns subject matter, this application is a continuation-in-part of my application Serial No. 759,801, filed December 29, 1934, now Patent No. 2,060,129, dated Nov. 10, 1936.

I claim:

1. A method of smoothly coating a base which comprises applying thereto as successive smooth coats a very fluent aqueous composition containing water-dispersed rubber and sufficient water-immiscible but volatile rubber solvent to swell the dispersed rubber particles appreciably but short of inducing their coagulation; and developing a smooth multiple coating substantially devoid of streakiness and blotchiness by drying each coat before a successive coat is applied; said rubber solvent not only swelling the dispersed rubber particles and transforming them to a stickier state but softening an already applied and dried coat so as to ensure a non-peeling, autogenous weld or fusion between coats.

2. A method of smoothly coating a base which comprises applying thereto as successive smooth coats a very fluent aqueous composition containing water-dispersed rubber and sufficient water-immiscible but volatile rubber solvent to swell the dispersed rubber particles appreciably but short of inducing their coagulation; and developing a smooth multiple coating substantially devoid of streakiness and blotchiness by drying each coat in the presence of warm air before a successive coat is applied; said rubber solvent not only swelling the dispersed rubber particles and transforming them to a stickier state but softening an already applied and dried coat so as to ensure a non-peeling, autogenous weld or fusion between coats.

3. A method of smoothly coating a base which comprises applying thereto as successive smooth coats a very fluent aqueous composition containing water-dispersed rubber, a water-soluble, film-forming substance compatible with the water-dispersed rubber and capable of developing hardness and smoothness in said coats, and sufficient water-immiscible but volatile rubber solvent to swell the dispersed rubber particles appreciably but short of inducing their coagulation; and developing a smooth multiple coating substantially devoid of streakiness and blotchiness by drying each coat before a successive coat is applied; said rubber solvent not only swelling the dispersed rubber particles and transforming them to a stickier state but softening an already applied and dried coat so as to ensure a non-peeling, autogenous weld or fusion between coats.

4. A method of smoothly coating a base which comprises applying thereto as successive smooth coats a very fluent aqueous composition containing water-dispersed rubber, a water-soluble, film-forming substance compatible with the water-dispersed rubber and capable of developing hardness and smoothness in said coats, and sufficient water-immiscible but volatile rubber solvent to swell the dispersed rubber particles appreciably but short of inducing their coagulation; and developing a smooth multiple coating substantially devoid of streakiness and blotchiness by drying each coat in the presence of warm air before a successive coat is applied; said rubber solvent not only swelling the dispersed rubber particles and transforming them to a stickier state but softening an already applied and dried coat so as to ensure a non-peeling, autogenous weld or fusion between coats.

5. A method of smoothly coating a base, which comprises applying thereto as successive smooth coats a very fluent aqueous composition comprising water-dispersed rubber, water-soluble glue, and sufficient water-immiscible but volatile rubber solvent to swell the dispersed rubber particles appreciably but short of inducing their coagulation; and drying the coats and insolubilizing their glue content; said rubber solvent not only swelling the dispersed rubber particles and transforming them to a stickier state but softening an already applied and dried coat so as to ensure a non-peeling, autogenous weld or fusion between coats.

6. A method of smoothly coating a rubber-impregnated fibrous base, which comprises applying thereto as successive smooth coats a very fluent aqueous composition comprising water-dispersed rubber, water-soluble glue, a plasticizing agent for said glue, and sufficient water-immiscible but volatile rubber solvent to swell the dispersed rubber particles appreciably but short of inducing their coagulation; and drying the coats and tanning their glue content; said rubber solvent not only swelling the dispersed rubber particles and transforming them to a stickier state but softening an already applied and dried coat so as to ensure a non-peeling, autogenous weld or fusion between coats.

7. A method of smoothly coating a glycerinated, rubber-impregnated fiber base, which comprises applying thereto as successive smooth coats a very fluent aqueous composition containing water-dispersed rubber, glycerine, water-soluble glue, and sufficient water-immiscible but volatile rubber solvent to swell the dispersed rubber particles appreciably but short of inducing their coagulation; and drying the successive coats and tanning their glue content; said rubber solvent not only swelling the dispersed rubber particles and transforming them to a stickier state but softening an already applied and dried coat so as to ensure a non-peeling, autogenous weld or fusion between coats.

8. In a method that involves applying a very fluent aqueous composition containing water-dispersed rubber as a succession of smooth coatings and drying the composition between the successive coatings, the practice of preventing the peeling of the successive coatings which comprises adding a water-immiscible but volatile rubber-swelling agent to such aqueous composition containing the water-dispersed rubber in amount to swell the dispersed rubber particles appreciably but short of inducing their coagulation, said rubber-swelling agent not only swelling the dispersed rubber particles and transforming them to a stickier state but softening a previously applied coating so as to ensure a non-peeling, autogenous weld or fusion between coatings.

9. In a method that involves applying a very fluent aqueous composition containing water-dispersed rubber and water-soluble glue as a succession of smooth coatings and drying the composition between the successive coatings, the practice of preventing the peeling of the successive coatings, which comprises including in said composition in emulsified form stabilized at least in part by the glue content of said composition a water-immiscible but volatile rubber-swelling agent in amount to swell the dispersed rubber particles appreciably but short of inducing their coagulation, said rubber-swelling agent not only swelling the dispersed rubber particles and transforming them to a stickier state but softening a previously applied coating so as to ensure a non-peeling, autogenous weld or fusion between coatings.

MILTON O. SCHUR.